US010364680B2

(12) United States Patent
Teller et al.

(10) Patent No.: US 10,364,680 B2
(45) Date of Patent: Jul. 30, 2019

(54) GAS TURBINE ENGINE COMPONENT HAVING PLATFORM TRENCH

(75) Inventors: Bret M. Teller, Meriden, CT (US); Mark F. Zelesky, Bolton, CT (US); Scott D. Lewis, Vernon, CT (US); Brandon W. Spangler, Vernon, CT (US); Ricardo Trindade, Coventry, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 2020 days.

(21) Appl. No.: 13/585,274

(22) Filed: Aug. 14, 2012

(65) Prior Publication Data
US 2014/0047844 A1 Feb. 20, 2014

(51) Int. Cl.
*F01D 5/18* (2006.01)
*F01D 11/24* (2006.01)

(52) U.S. Cl.
CPC .............. *F01D 5/187* (2013.01); *F01D 11/24* (2013.01); *F05D 2240/11* (2013.01); *F05D 2240/81* (2013.01); *F05D 2260/201* (2013.01); *Y02T 50/676* (2013.01)

(58) Field of Classification Search
CPC ... F01D 5/22; F01D 5/18; F01D 5/187; F01D 11/005; F01D 11/006
See application file for complete search history.

(56) References Cited

U.S. PATENT DOCUMENTS

| 5,344,283 | A | * | 9/1994 | Magowan et al. ............. 415/115 |
| 6,139,258 | A | | 10/2000 | Lang, III et al. |
| 6,164,912 | A | | 12/2000 | Tabbita et al. |
| 6,210,111 | B1 | * | 4/2001 | Liang .......................... 416/97 R |
| 7,650,926 | B2 | * | 1/2010 | Tholen .......................... 164/516 |
| 7,695,247 | B1 | | 4/2010 | Liang |
| 7,704,039 | B1 | | 4/2010 | Liang |
| 8,105,030 | B2 | | 1/2012 | Abdel-Messeh et al. |
| 8,109,725 | B2 | | 2/2012 | Abdel-Messeh et al. |
| 8,133,024 | B1 | | 3/2012 | Liang |
| 8,157,527 | B2 | | 4/2012 | Piggush et al. |
| 2005/0123388 | A1 | | 6/2005 | Brain Chan et al. |
| 2007/0020087 | A1 | | 1/2007 | Durocher et al. |
| 2009/0074562 | A1 | | 3/2009 | Self et al. |

(Continued)

FOREIGN PATENT DOCUMENTS

EP 1892383 A1 2/2008

OTHER PUBLICATIONS

International Search Report and Written Opinion for PCT Application No. PCT/US2013/054091 dated Nov. 1, 2013.

(Continued)

*Primary Examiner* — David E Sosnowski
*Assistant Examiner* — Cameron A Corday
(74) *Attorney, Agent, or Firm* — Carlson, Gaskey & Olds, P.C.

(57) ABSTRACT

A component for a gas turbine engine according to an exemplary aspect of the present disclosure includes, among other things, a platform that axially extends between a leading edge and a trailing edge and circumferentially extends between a first mate face and a second mate face and a trench disposed on at least one of the first mate face and the second mate face. A plurality of cooling holes are axially disposed within the trench.

19 Claims, 4 Drawing Sheets

(56) References Cited

U.S. PATENT DOCUMENTS

| | | | |
|---|---|---|---|
| 2009/0116953 A1* | 5/2009 | Spangler et al. | 415/115 |
| 2009/0269184 A1* | 10/2009 | Spangler et al. | 415/115 |
| 2010/0316486 A1* | 12/2010 | Townes | F01D 5/225 |
| | | | 415/115 |
| 2011/0044795 A1 | 2/2011 | Chon et al. | |
| 2011/0176929 A1 | 7/2011 | Amman et al. | |
| 2011/0186550 A1 | 8/2011 | Gannelli et al. | |
| 2011/0229344 A1 | 9/2011 | Johnson | |
| 2011/0311369 A1 | 12/2011 | Ramachandran et al. | |
| 2012/0070305 A1 | 3/2012 | Ammann et al. | |

OTHER PUBLICATIONS

International Preliminary Report on Patentability for PCT Application No. PCT/US2013/054091, dated Feb. 26, 2015.
Extended European Search Report for Application No. EP 13 82 9663 dated Jul. 13, 2015.

* cited by examiner

GAS TURBINE ENGINE COMPONENT HAVING PLATFORM TRENCH

BACKGROUND

This disclosure relates to a gas turbine engine, and more particularly to a gas turbine engine component having a platform trench.

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Various components of the gas turbine engine, including but not limited to blades, vanes and blade outer air seals (BOAS), may be subjected to repetitive thermal cycling under widely ranging temperatures and pressures. Therefore, portions of such components may be susceptible to gas ingestion and hot profile migration conditions that create local hot spots on the components. Some components may require dedicated cooling airflow to cool the components during engine operation.

SUMMARY

A component for a gas turbine engine according to an exemplary aspect of the present disclosure includes, among other things, a platform that axially extends between a leading edge and a trailing edge and circumferentially extends between a first mate face and a second mate face. A trench is disposed on at least one of the first mate face and the second mate face. A plurality of cooling holes are axially disposed within the trench.

In a further non-limiting embodiment of the foregoing component, the platform is part of a blade.

In a further non-limiting embodiment of either of the foregoing components, the platform is part of a vane.

In a further non-limiting embodiment of any of the foregoing components, the platform is part of a blade outer air seal (BOAS).

In a further non-limiting embodiment of any of the foregoing components, another trench is disposed on the other of the first mate face and the second mate face.

In a further non-limiting embodiment of any of the foregoing components, the plurality of cooling holes are in fluid communication with a cavity of the component.

In a further non-limiting embodiment of any of the foregoing components, an outlet of each of the plurality of cooling holes opens into the trench.

In a further non-limiting embodiment of any of the foregoing components, the trench extends between the leading edge and the trailing edge of the platform.

In a further non-limiting embodiment of any of the foregoing components, the trench is radially centered on the at least one of the first mate face and the second mate face.

In a further non-limiting embodiment of any of the foregoing components, the trench is disposed on a pressure side of the component.

In a further non-limiting embodiment of any of the foregoing components, the trench is disposed on a suction side of the component.

In a further non-limiting embodiment of any of the foregoing components, the trench is disposed on each of a pressure side and a suction side of the component.

A gas turbine engine according to an exemplary aspect of the present disclosure includes, among other things, a compressor section, a combustor section in fluid communication with the compressor section and a turbine section in fluid communication the combustor section. A component is positioned within at least one of the compressor section and the turbine section. The component includes a platform that axially extends between a leading edge and a trailing edge and circumferentially extends between a first mate face and a second mate face. The trench is disposed on at least one of the first mate face and the second mate face. At least one cooling hole is disposed within the trench.

In a further non-limiting embodiment of the foregoing gas turbine engine, the component includes a cavity in fluid communication with the at least one cooling hole.

In a further non-limiting embodiment of either of the foregoing gas turbine engines, the component is a turbine blade.

In a further non-limiting embodiment of any of the foregoing gas turbine engines, a second component is adjacent to the component. A seal is positioned between the component and the second component.

In a further non-limiting embodiment of any of the foregoing gas turbine engines, the seal is positioned radially inwardly from the platform of the component.

A method of cooling a component of a gas turbine engine according to another exemplary aspect of the present disclosure including, among other things, communicating a cooling airflow through a cavity of the component, extracting a portion of the cooling airflow from the cavity, communicating the portion of the cooling airflow into at least one cooling hole that is in fluid communication with the cavity, and communicating the portion of the cooling airflow through an outlet of the at least one cooling hole that opens into a trench of a platform of the component.

In a further non-limiting embodiment of the foregoing method of cooling a component of a gas turbine engine, a portion of the cooling airflow travels axially along the trench to cool the platform.

In a further non-limiting embodiment of either of the foregoing methods of cooling a component of a gas turbine engine, the portion of the cooling airflow travels axially along the trench prior to being returned to a core flow path of the gas turbine engine.

The various features and advantages of this disclosure will become apparent to those skilled in the art from the following detailed description. The drawings that accompany the detailed description can be briefly described as follows.

DETAILED DESCRIPTION

Figure 1:
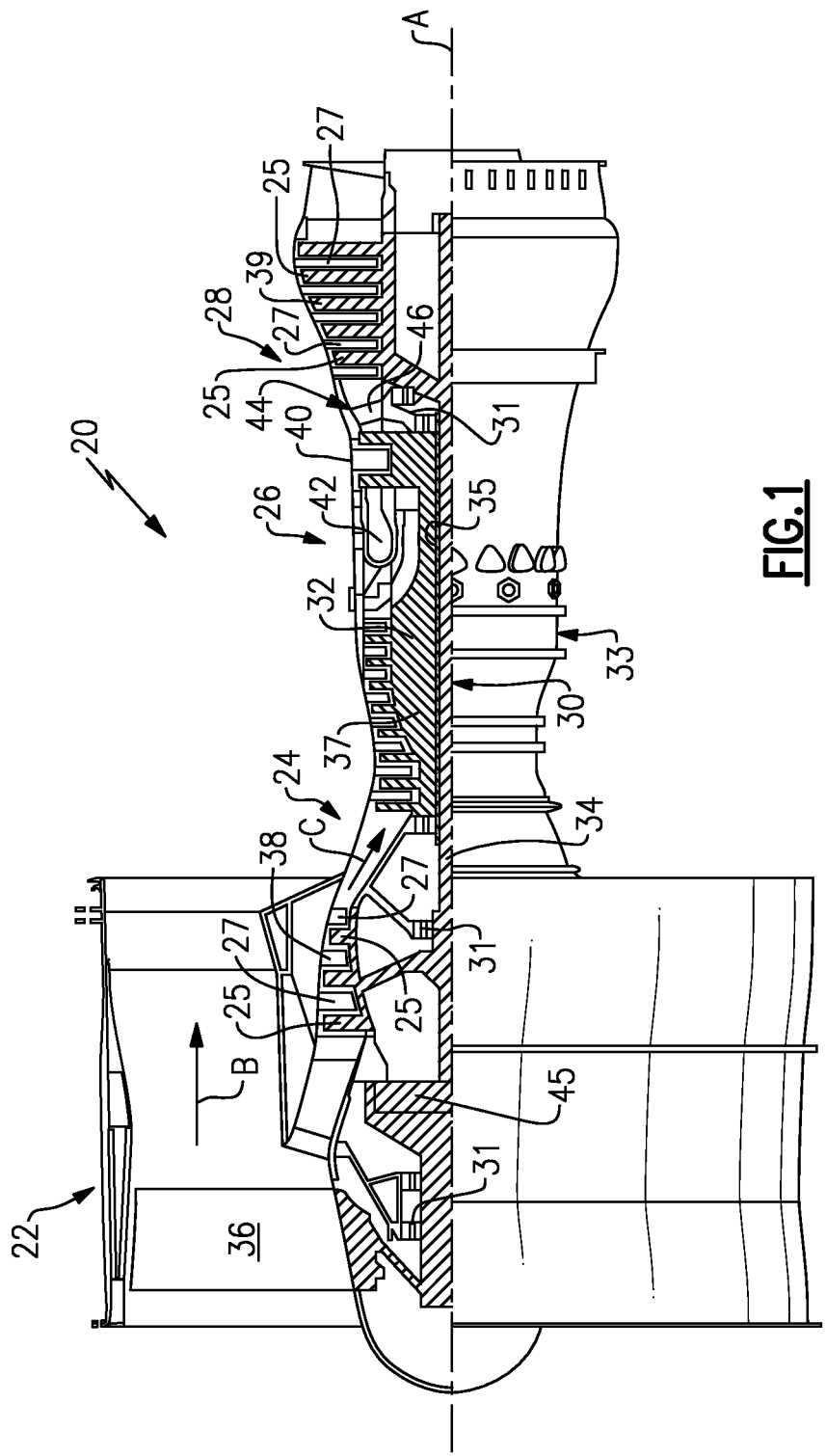
FIG. 1 schematically illustrates a cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that extend into the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In one non-limiting example, the gas turbine engine 20 is a high-bypass geared aircraft engine. In a further example, the gas turbine engine 20 bypass ratio is greater than about six (6:1). The geared architecture 45 can include an epicyclic gear train, such as a planetary gear system or other gear system. The example epicyclic gear train has a gear reduction ratio of greater than about 2.3, and in another example is greater than about 2.5:1. The geared turbofan enables operation of the low speed spool 30 at higher speeds which can increase the operational efficiency of the low pressure compressor 38 and low pressure turbine 39 and render increased pressure in a fewer number of stages.

A pressure ratio associated with the low pressure turbine 39 is pressure measured prior to the inlet of the low pressure turbine 39 as related to the pressure at the outlet of the low pressure turbine 39 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 of the rotor assemblies to either add or extract energy.

Various components of the gas turbine engine 20, including but not limited to blades, vanes and/or blade outer air seals (BOAS) of the compressor section 24 and/or the turbine section 28, may be subjected to repetitive thermal cycling under widely ranging temperatures and pressures. The hardware of the turbine section 28 is particularly subjected to relatively extreme operating conditions. Therefore, some components may require dedicated cooling airflow for cooling the parts during engine operation. Examples of such components are detailed below.

Figure 2:
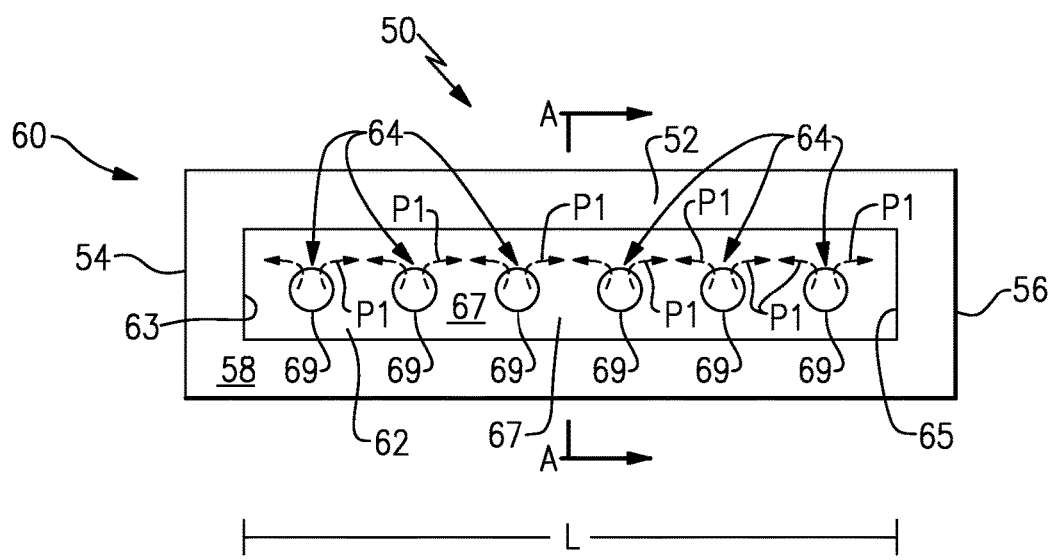
FIG. 2 illustrates a component that can be incorporated into a gas turbine engine.

FIG. 2 illustrates a highly schematic view of a component 50 that can be incorporated into a gas turbine engine, such as the gas turbine engine 20 of FIG. 1. The component 50 could be representative of any component that extends into the core flow path C (FIG. 1), including but not limited to blades, vanes and/or BOAS of the compressor section 24 and/or the turbine section 28. It should be understood that the teachings of this disclosure could extend to any hardware of the gas turbine engine 20.

In this exemplary embodiment, the component 50 includes a platform 52. The term "platform" indicates any surface of the component 50 that makes up the inner or outer end walls of the core flow path C. For example, as described below, the platform could be part of a turbine blade. The platform 52 axially extends between a leading edge 54 and a trailing edge 56 and can circumferentially extend between a first mate face 58 and a second mate face 60 (as best shown in FIG. 3).

One or both of the mate faces 58, 60 can include a trench 62. The trench 62 can be disposed on the first mate face 58 and/or the second mate face 60 and can extend axially between the leading edge 54 and the trailing edge 56 of the platform 52. The trench 62 may extend a length L between the leading edge 54 and the trailing edge 56, or could extend smaller (or greater) distances therebetween. In this embodiment, the trench 62 axially extends between an upstream wall 63 and a downstream wall 65 of the trench 62. The actual dimensions of the trench 62 can vary depending upon design specific parameters, including but not limited to the pressure distribution and cooling requirements of the component 50. In this exemplary embodiment, the trench 62 is radially centered on the first mate face 58 of the platform 52.

One or more cooling holes 64 can be disposed within the trench 62. The cooling hole(s) 64 may be cast or machined into the platform 52. In this embodiment, a plurality of cooling holes 64 are axially disposed along a circumferential wall 67 of the trench 62. The circumferential wall 67 is offset from the first mate face 58 in a direction toward the second mate face 60 (See FIG. 3). The trench 62 could include a single cooling hole 64 or could include multiple cooling holes 64. The actual number of cooling holes is design specific and may depend on the cooling requirements of the component 50, among other parameters. An outlet 69 of each cooling hole 64 opens into the trench 62.

Figure 3:
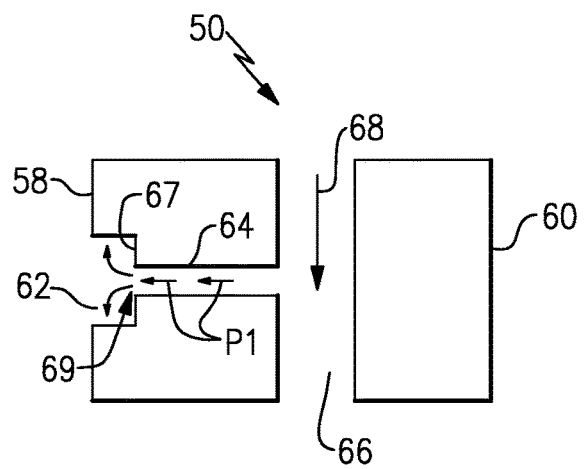
FIG. 3 illustrates a cross-sectional view through section A-A of the component of FIG. 2.

Referring to FIG. 3, the cooling hole(s) 64 may be in fluid communication with a cavity 66 that extends inside of, or partially through, the component 50. In this embodiment, the cooling hole 64 extends transversely relative to the cavity 66. Cooling airflow 68, such as a bleed airflow that can be sourced from the compressor section 24 or any other portion of the gas turbine engine 20, can be communicated through the cavity 66 to cool the internal surfaces of the component 50. A portion P1 of the cooling airflow 68 can be extracted from the cavity 66 and communicated into the cooling hole 64. The portion P1 of the cooling airflow 68 can then be communicated through the outlet 69 of each cooling hole 64. Once within the trench 62, the cooling airflow 68 may then travel axially along the trench 62 (see FIG. 2) and radially within the trench 62 to cool one or both of the mate faces 58, 60 of the platform 52. For example, the cooling airflow P1 can axially travel along the circumferential wall 67 of the trench 62 prior to being returned to the core flow path C of the gas turbine engine 20.

Figure 4:
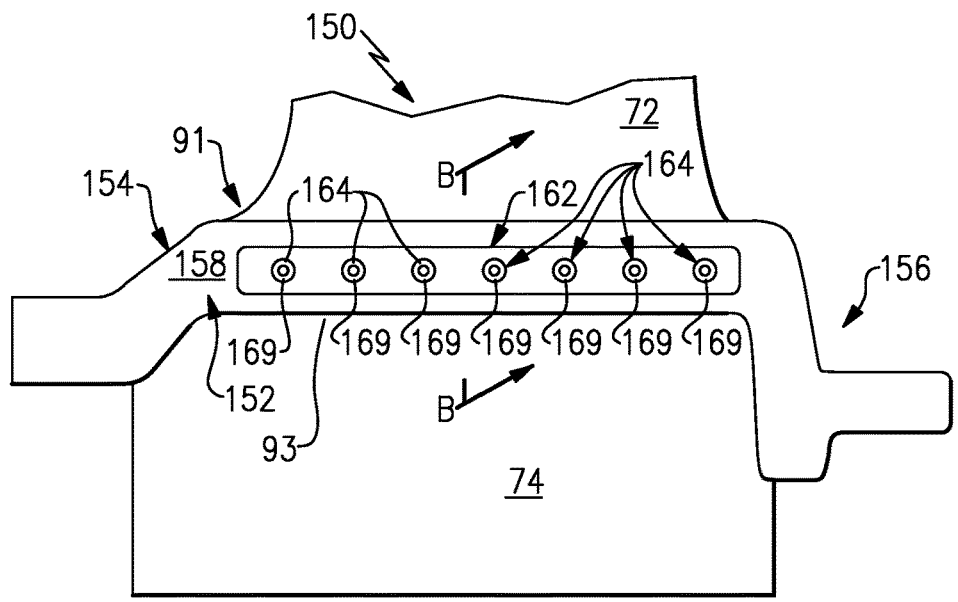
FIG. 4 illustrates another exemplary component that can be incorporated into a gas turbine engine.

FIG. 4 illustrates another exemplary component 150 that can be incorporated into the gas turbine engine 20. In this disclosure, like reference numerals represent like features, whereas reference numerals modified by "100" are indicative of slightly modified features. In this particular embodiment, the component 150 represents a blade, such as a turbine blade. However, the teachings of this disclosure are not limited to turbine blades.

The component 150 includes a platform 152, an airfoil 72 that extends from a first side 91 of the platform 152, and a root portion 74 that extends from a second side 93 of the platform 152 that is opposite from the first side 91.

Figure 5:
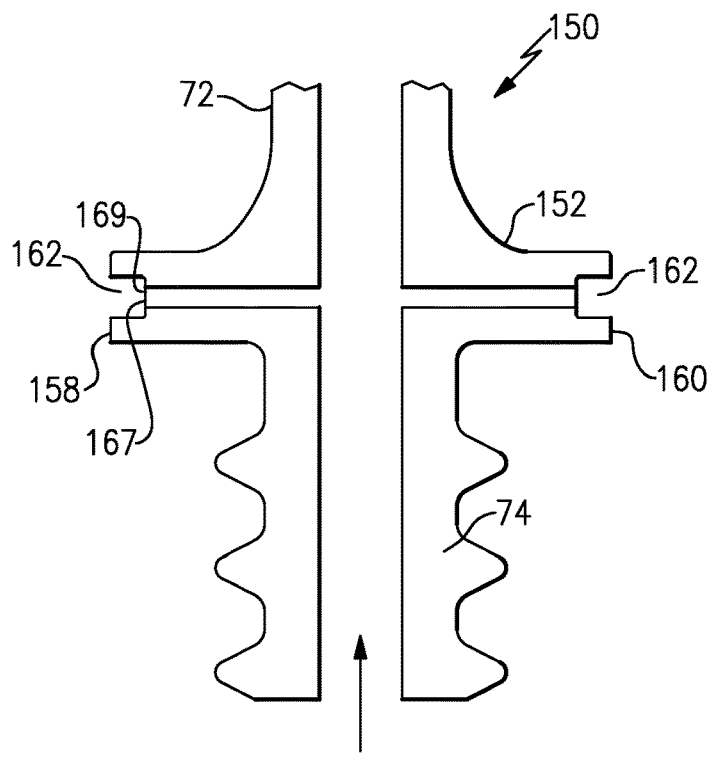
FIG. 5 illustrates a cross-sectional view through section B-B of the component of FIG. 4.

The platform 152 axially extends between a leading edge 154 and a trailing edge 156 and circumferentially extends between a first mate face 158 and a second mate face 160. In this exemplary embodiment, a trench 162 is disposed on the first mate face 158 (i.e., on a pressure side of the component 150) only. However, a trench 162 could also be established relative to the second mate face 160 (i.e., on a suction side of the component 150), or on both the first mate face 158 and the second mate face 160 (see FIG. 5).

One or more cooling holes 164 can be positioned within the trench 162. The cooling hole(s) 164 may be cast or machined into the platform 152. In this embodiment, a plurality of cooling holes 164 are axially disposed along a circumferential wall 167 of the trench 162. The circumferential wall 167 is offset from the first mate face 158 in a direction toward the second mate face 160 (See FIG. 5). The trench 162 could include only a single cooling hole 164 or could include multiple cooling holes 164. An outlet 169 of each cooling hole 164 opens into the trench 162. In the FIG. 5 embodiment where a trench 162 is disposed on both the first mate face 158 and the second mate face 160, the cooling holes 164 may be aligned in the radial direction and staggered in the circumferential direction.

Figure 6:
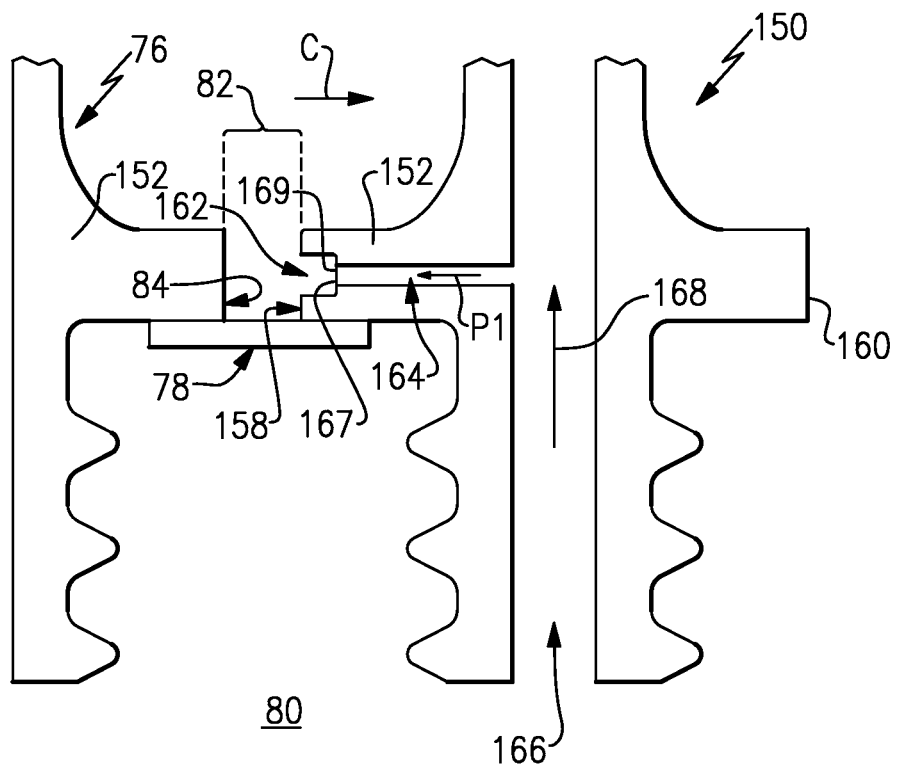
FIG. 6 illustrates yet another component that can be incorporated into a gas turbine engine.

Referring to FIG. 6, the component 150 can be positioned within the gas turbine engine 20 adjacent to a second component 76. A gap 82 extends between the mate face 158 of the component 150 and a mate face 84 of the second component 76. Although not shown, the component 150 and the second component 76 may be carried by a rotor disk for rotation about the engine centerline longitudinal axis A. A seal 78, such as a floating seal or any other suitable seal, can be positioned radially inwardly from the platforms 152 of the component 150 and the second component 76. The seal 78 prevents the escape of airflow from a cavity 80 positioned radially inward from the core flow path C to the core flow path C.

The component 150 also includes a cavity 166 that can receive a cooling airflow 168 for cooling the internal surfaces of the component 150. A portion P1 of the cooling airflow 168 can be extracted from the cavity 166 and communicated within the cooling hole(s) 164. In other words, the cooling hole(s) 164 is in fluid communication with the cavity 166. The portion P1 of the cooling airflow 168 can then be communicated through the outlet 169 of each cooling hole 164 and into the trench 162. The portion P1 of the cooling airflow 168 can be communicated axially along the length of the trench 162 to cool the platform 152 before being returned to the core flow path C.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A component for a gas turbine engine, comprising:
a platform that axially extends between a leading edge and a trailing edge and circumferentially extends between a first mate face and a second mate face;

a trench disposed on at least one of said first mate face and said second mate face;
a plurality of cooling holes axially disposed within said trench; and
a cavity disposed at least partially inside an airfoil that extends from said platform, said plurality of cooling holes being configured to directly receive fluid from a radially extending portion of said cavity.

2. The component as recited in claim 1, wherein said platform is part of a blade.

3. The component as recited in claim 1, wherein said platform is part of a vane.

4. The component as recited in claim 1, comprising another trench disposed on the other of said first mate face and said second mate face.

5. The component as recited in claim 1, wherein an outlet of each of said plurality of cooling holes opens into said trench.

6. The component as recited in claim 1, wherein said trench extends between said leading edge and said trailing edge of said platform.

7. The component as recited in claim 1, wherein said trench is radially centered on at least one of said first mate face and said second mate face.

8. The component as recited in claim 1, wherein said trench is disposed on a pressure side of the component.

9. The component as recited in claim 1, wherein said trench is disposed on a suction side of the component.

10. The component as recited in claim 1, wherein said trench is disposed on each of a pressure side and a suction side of the component.

11. The component as recited in claim 1, wherein said cavity extends inside said platform, inside said airfoil and inside a root portion that extends from said platform in an opposite direction from said airfoil.

12. The component as recited in claim 1, wherein said radially extending portion of said cavity extends through both a root portion and said airfoil of said component.

13. A gas turbine engine, comprising:
a compressor section;
a combustor section in fluid communication with said compressor section;
a turbine section in fluid communication said combustor section;
a component positioned within at least one of said compressor section and said turbine section, wherein said component includes:
a platform that axially extends between a leading edge and a trailing edge and circumferentially extends between a first mate face and a second mate face;
a trench disposed on at least one of said first mate face and said second mate face, said trench extending from an upstream wall disposed proximate to said leading edge to a downstream wall disposed proximate to said trailing edge;
at least one cooling hole disposed within said trench; and
cavity extending inside said platform, said cavity having radially extending portion configured to directly communicate fluid to said at least one cooling hole; and
a second component adjacent to said component, wherein a seal is positioned between said component and said second component.

14. The gas turbine engine as recited in claim 13, wherein said component is a turbine blade.

15. The gas turbine engine as recited in claim 13, wherein said seal is positioned radially inwardly from said platform of said component.

16. The gas turbine engine as recited in claim 13, said second component having a second platform with a third mate face that is configured without either a trench or a cooling hole that opens into said trench.

17. A method of cooling a component of a gas turbine engine, comprising the steps of:
communicating a cooling airflow through a cavity located inside of the component;
extracting a portion of the cooling airflow from a radially extending portion of the cavity;
directly communicating the portion of the cooling airflow from the cavity into at least one cooling hole that is in fluid communication with the cavity; and
communicating the portion of the cooling airflow through an outlet of the at least one cooling hole that opens into a trench of a platform of the component.

18. The method as recited in claim 17, wherein the portion of the cooling airflow travels axially along the trench to cool the platform.

19. The method as recited in claim 17, wherein the portion of the cooling airflow travels axially along the trench prior to being returned to a core flow path of the gas turbine engine.

* * * * *